(12) United States Patent
Leutgeb et al.

(10) Patent No.: US 8,265,198 B2
(45) Date of Patent: Sep. 11, 2012

(54) ADAPTIVE EDGE EQUALIZATION OF ASK-MODULATED SIGNALS

(75) Inventors: Thomas Leutgeb, Lieboch (AT); Helmut Koroschetz, Lieboch (AT)

(73) Assignee: Infineon Technologies AG (DE)

( * ) Notice: Subject to any disclaimer, the term of this patent is extended or adjusted under 35 U.S.C. 154(b) by 1414 days.

(21) Appl. No.: 11/548,861

(22) Filed: Oct. 12, 2006

(65) Prior Publication Data

US 2008/0025436 A1  Jan. 31, 2008

(30) Foreign Application Priority Data

Jul. 27, 2006  (DE) .................. 10 2006 034 827

(51) Int. Cl.
*H03K 9/00* (2006.01)
*H04L 27/00* (2006.01)
(52) U.S. Cl. ........................................ 375/316
(58) Field of Classification Search ............ 375/316
See application file for complete search history.

(56) References Cited

U.S. PATENT DOCUMENTS

| | | | |
|---|---|---|---|
| 2002/0153902 A1* | 10/2002 | Thiel et al. ............. | 324/600 |
| 2004/0104767 A1* | 6/2004 | Prexl et al. ............. | 329/347 |
| 2006/0028342 A1 | 2/2006 | Choi et al. | |
| 2006/0085655 A1 | 4/2006 | Sung et al. | |
| 2007/0025421 A1* | 2/2007 | Shattil .................... | 375/136 |
| 2008/0026712 A1 | 1/2008 | Leutgeb et al. | |
| 2008/0246541 A1* | 10/2008 | Kranabenter ........... | 329/347 |

FOREIGN PATENT DOCUMENTS

| | | |
|---|---|---|
| DE | 199 27 320 A1 | 12/2000 |
| DE | 102 29 460 B3 | 1/2004 |
| EP | 1 231 557 B1 | 8/2002 |
| WO | WO-2006/008685 A1 | 1/2006 |
| WO | WO 2006008685 A1 * | 1/2006 |

* cited by examiner

*Primary Examiner* — Dac Ha
*Assistant Examiner* — Tanmay Shah
(74) *Attorney, Agent, or Firm* — Dickstein Shapiro LLP

(57) ABSTRACT

A signal processing circuit including a demodulator having an input for receiving a received signal which includes falling and rising signal edges, and an output for outputting a demodulated received signal which, with signal edges of the received signal, includes transitions from a first level to a second level or vice versa, wherein times of the transitions depend on steepnesses of the signal edges. Additionally, the circuit includes a signal generator having an input for receiving the demodulated received signal and coupled to the output of the demodulator, and an output for outputting a corrected demodulated received signal which includes transitions, the times of which relative to the times of the transitions of the demodulated received signal are set based on a reference signal to reduce influences of the steepnesses of the falling and rising signal edges in the corrected demodulated received signal relative to the demodulated received signal.

34 Claims, 5 Drawing Sheets

ADAPTIVE EDGE EQUALIZATION OF ASK-MODULATED SIGNALS

CROSS-REFERENCE TO RELATED APPLICATIONS

This application claims priority from German Patent Application No. 102006034827.3, which was filed on Jul. 27, 2006, and is incorporated herein by reference in its entirety.

BACKGROUND

The present invention relates to a signal processing circuit for demodulating amplitude-modulated signals as are, for example, present in RFID systems.

Amplitude shift keying (ASK) is a digital type of modulation which has found various fields of application due to its low-expense signal processing. Exemplarily, it is employed in RFID systems (RFID=radio frequency identification) allowing wireless identification of a transponder and wireless data transmissions. Further fields of application of amplitude shift keying are, for example, in the field of radio clocks where a carrier signal transmits current time and datum information to synchronize time. Radio beacons for identifying a location are another example. Here, a carrier signal is modulated by a continuous tone in the audio range for an easier identification, the audio tone in turn is modulated (sampled) according to a desired Morse code so that both the direction can be determined and the transmitter itself can be identified using the overall signal aimed at. The so-called on-off keying (OOK) may be mentioned as the simplest variation of amplitude shift keying. In this method, a carrier signal is switched on and off to transmit a binary "1" and "0", respectively.

BRIEF SUMMARY

According to an embodiment, the present invention provides a signal processing circuit comprising a demodulator having an input for receiving a received signal, which includes falling and rising signal edges, and an output for outputting a demodulated received signal which, with signal edges of the received signal, includes transitions from a first level to a second level or vice versa, wherein times of the transitions depend on steepnesses of the signal edges. Furthermore, the signal processing circuit includes a signal generator having an input for receiving the demodulated received signal and coupled to the output of the demodulator, and an output for outputting a corrected demodulated received signal which includes transitions, the times of which relative to times of transitions of the demodulated received signal are set based on a reference signal to reduce influences of the steepnesses of the falling and rising signal edges in the corrected demodulated received signal relative to the demodulated received signal.

According to another embodiment, the present invention provides a device for generating a corrected demodulated received signal comprising means for demodulating a received signal which includes falling and rising signal edges, and for generating a demodulated received signal which, with signal edges of the received signal, includes transitions from a first level to a second level or vice versa, wherein times of transitions depend on steepnesses of the signal edges. Furthermore, the device for generating a corrected demodulated received signal includes means for generating the corrected demodulated received signal which includes transitions, the times of which relative to times of transitions in the demodulated received signal are set based on a reference signal to reduce influences of the steepnesses of the falling and rising signal edges in the corrected demodulated received signal relative to the demodulated received signal.

According to another embodiment, the present invention provides a method for generating a corrected demodulated received signal comprising demodulating a received signal which includes falling and rising signal edges to generate a demodulated received signal which includes, with signal edges of the received signal, transitions from a first level to a second level or vice versa, wherein times of the transitions depend on steepnesses of the signal edges. Furthermore, the inventive method includes generating the corrected demodulated received signal by setting times of transitions in the corrected demodulated received signal relative to times of the transitions in the demodulated received signal based on a reference signal to reduce influences of the steepnesses of the falling and rising signal edges in the corrected demodulated received signal relative to the demodulated received signal.

BRIEF DESCRIPTION OF THE DRAWINGS

Embodiments of the present invention will be detailed subsequently referring to the appended drawings, in which.

DETAILED DESCRIPTION

Figure 5:
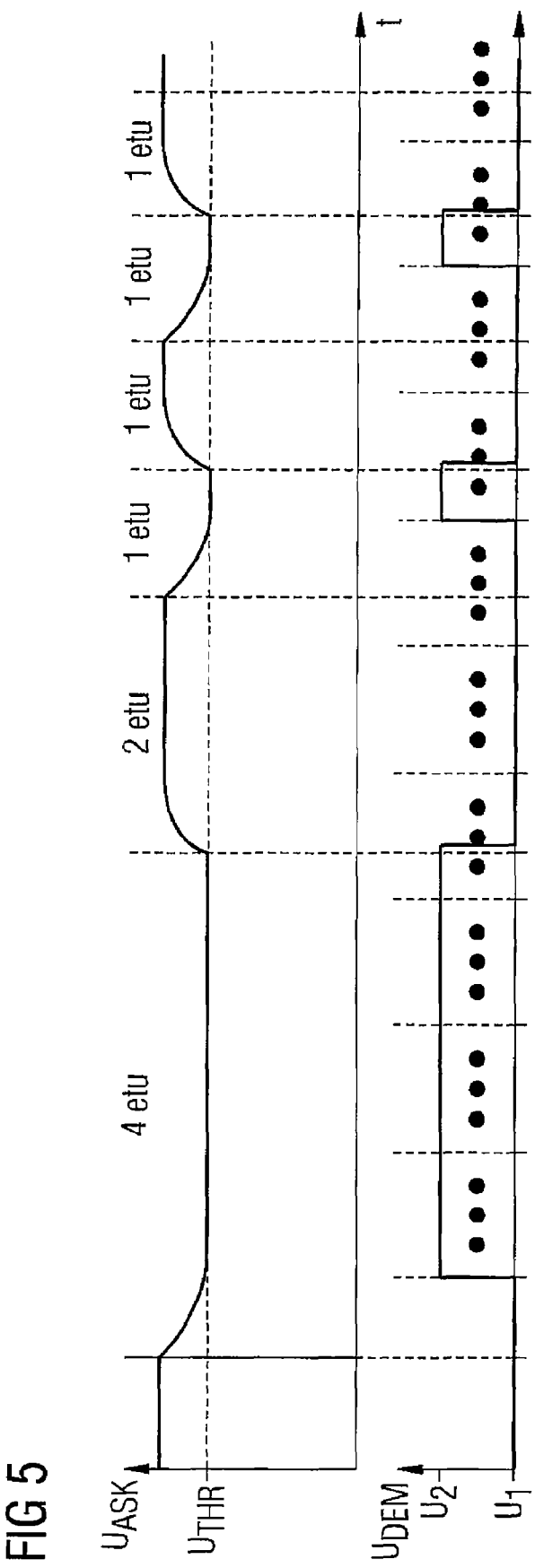
FIG. 5 shows principle signal forms for illustrating distortions by real signal edges.

The envelope of an ASK-modulated signal is illustrated at the top of FIG. 5. FIG. 5 shows two signal times for voltages $U_{ASK}$ and $U_{DEM}$. The upper signal form $U_{ASK}$ shows the envelope of an ASK-modulated signal. The bottom signal form shows a signal $U_{DEM}$ extracted from the signal $U_{ASK}$ when demodulating. Thus, a threshold value decision is made, which means that the signal $U_{ASK}$ is compared to a threshold $U_{THR}$. The threshold value $U_{THR}$ is also illustrated in the signal form of $U_{ASK}$ at the top of FIG. 5. When demodulating, the voltage $U_{ASK}$ is compared to the threshold $U_{THR}$ and if the signal $U_{ASK}$ has an amplitude greater than $U_{THR}$, the demodulated signal $U_{DEM}$ will take a signal level $U_1$, and if the amplitude of $U_{ASK}$ is smaller than the threshold value $U_{THR}$, the signal $U_{DEM}$ will take the signal level $U_2$.

The signal form of $U_{DEM}$ for an exemplary threshold value $U_{THR}$ is illustrated at the bottom of FIG. 5 for the two signal levels $U_1$ and $U_2$. One can recognize that the times of a level change in the demodulated signal $U_{DEM}$ depend on the edge steepness of the envelopes of the ASK-modulated signal $U_{ASK}$. The flatter, for example, a form of a falling signal edge in the signal $U_{ASK}$, the later the value will fall below the threshold $U_{THR}$ and the later a level change will take place in the demodulated signal $U_{DEM}$. FIG. 5 illustrates this context for a relatively low selected threshold value $U_{THR}$.

The consequence is that the incoming level change in the demodulated signal $U_{DEM}$ will only take place relatively late, whereas the outgoing level change belonging to the rising signal edge of the envelope signal $U_{ASK}$ will take place relatively early. After the signal edge in the envelope signal $U_{ASK}$ has started falling, a relatively great amount of time will pass before a level change in the demodulated signal $U_{DEM}$ takes place. In the subsequent rising signal edge in the envelope signal $U_{ASK}$, the level change in the demodulated signal $U_{DEM}$ will take place relatively shortly after the edge has started rising. The consequence is that the duration between the two level changes in the demodulated signal $U_{DEM}$ is shortened. Time intervals between two signal edges in the envelope signal $U_{ASK}$ are indicated in FIG. 5 by broken lines.

There is always an integer multiple of an ETU (equivalent time unit) between two signal edges. One ETU corresponds to a symbol duration of a symbol modulated onto the envelope signal $U_{ASK}$. For comparison purposes, symbol durations in the demodulated signal $U_{DEM}$ are also indicated in FIG. 5 by broken lines. One can easily recognize by this that the duration between the two first level changes in the demodulated signal $U_{DEM}$ is shortened by the position of the threshold value $U_{THR}$. This effect is additionally illustrated in FIG. 5 by the fact that samples represented by black points are indicated in the signal form $U_{DEM}$. A sampler will, for example, form three samples after detecting a level change in the demodulated signal during a symbol duration corresponding to one ETU. A decoder may then decode the actual symbol using these samples. Usually, a majority decision takes place at this point. In the exemplary signal form illustrated in FIG. 5, the decoder would, for the fourth symbol, obtain the signal level $U_2$ once and the signal level value $U_1$ twice. This would result in the majority decision to decide for the signal level $U_1$. The procedure described is disadvantageous in that in this way errors in the detected received signal, i.e. in the data received, occur which may be attributed to the finite steepness of the signal edges in the envelope signal $U_{ASK}$.

Figure 6:
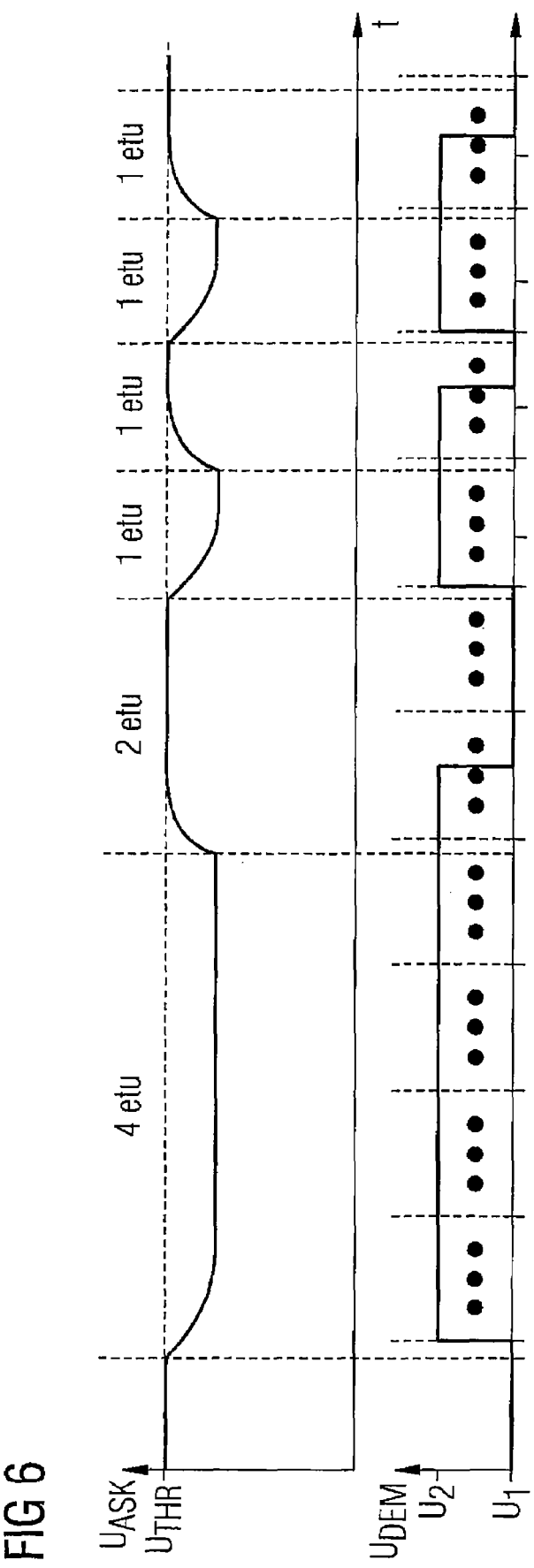
FIG. 6 shows principle signal forms for illustrating distortions by real signal edges.

FIG. 6 illustrates another disadvantage of the procedure described. FIG. 6 shows the same signal form of an envelope signal $U_{ASK}$ with a threshold value $U_{THR}$ which, compared to the forms illustrated in FIG. 5, has a higher position. The consequence is that the level change in a falling signal edge in the envelope signal $U_{ASK}$ in the demodulated signal $U_{DEM}$ will take place relatively close in time. This is illustrated at the bottom of FIG. 6. With a rising signal edge in the signal form of the envelope $U_{ASK}$, there are considerable delays until the level change in the demodulated signal $U_{DEM}$. Since in the example of FIG. 6 the threshold value $U_{THR}$ is assumed to be relatively high, it will, with a slowly rising signal edge, take correspondingly longer until the threshold value $U_{THR}$ is exceeded. The delay of the level change in the demodulated signal $U_{DEM}$ can be made out clearly in FIG. 6. Additionally, FIG. 6 shows samples in the form of black points, wherein it is also assumed here that a level change in the demodulated signal $U_{DEM}$ results in a sequence of three samples per symbol duration or ETU. One may recognize from FIG. 6 that in this example a decoder would then detect five symbols of a signal level $U_2$ instead of only four, since the level change after the last symbol in the demodulated signal $U_{DEM}$ is delayed by the effect described. In the example illustrated in FIG. 6, too, the result will be an error which is a great disadvantage of the procedure described.

Figure 1:
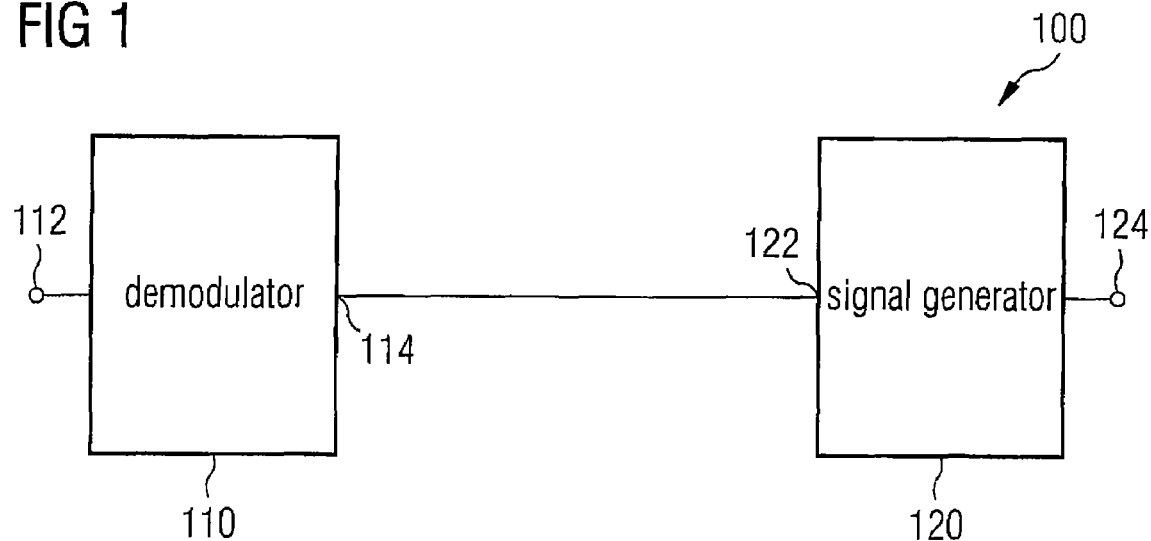
FIG. 1 is a principle block circuit diagram of an embodiment of the present invention.

A principle block circuit diagram of an embodiment of the present invention is illustrated in FIG. 1. FIG. 1 shows a signal processing circuit 100. The signal processing circuit 100 includes a demodulator 110 comprising an input terminal 112 and an output terminal 114, and a signal generator 120 comprising an input terminal 122 and an output terminal 124.

The demodulator 110 comprises an input 112 for a received signal, the received signal comprising falling and rising signal edges and the demodulator 110 comprising an output 114 for a demodulated received signal which, with signal edges of the received signal, has a transition from a first level to a second level or vice versa, wherein the time of the transition depends on the steepness of the signal edges. The signal generator 120 comprises an input 122 for the demodulated received signal coupled to the output 114 of the demodulator 100. Additionally, the signal generator 120 comprises an output 124 for a corrected demodulated received signal comprising transitions the times of which relative to times of transitions of the demodulated received signal are set on the basis of a reference signal to reduce influences of the steepnesses of the falling and rising signal edges in the corrected demodulated received signal relative to the demodulated received signal.

The signal generator 120 is, by virtue of knowing a reference signal exemplarily corresponding to a known training sequence, able to reduce influences of real signal edges in the received signal. Since the time when the reference signal occurs and the reference signal itself are known, the signal generator 120 will learn from the pertaining form of the demodulated received signal which time shift transitions in the demodulated received signal have experienced by the distorted signal edges in the received signal. Based on this knowledge, the signal generator 120 can adjust all the transitions in the demodulated received signal correspondingly.

Thus, embodiments of the present invention have the advantage that, by additionally considering a reference signal, i.e. a known signal, and by measuring the time intervals between the two level transitions in the demodulated received signal, the transitions in the demodulated received signal can be corrected corresponding to the delays caused by different signal edges. The correction of the demodulated received signal allows transmitting data with a reduced bit error rate, i.e. data transmission becomes more reliable and robust. The reduction in the bit error rate has the immediate consequence that information can be transmitted in a faster and safer manner.

The reference signal may, for example, correspond to a start tag, i.e. there is a known transmitting signal form at the beginning of the received signal which explains the transition distortions occurring in a demodulated received signal. As long as these distortions can be considered as static, the signal generator 120 can correct the distortions in subsequent level transitions in the demodulated received signal. Principally, the reference signals may consist of a known transmitted symbol or of a sequence of known transmitted symbols which may also be recurring or arranged after a known sequence in a transmitted signal.

In another embodiment of the present invention, a midamble or a post-amble may also be transmitted instead of a start tag which is also referred to as pre-amble. Radio signals of the category considered here are often divided into so-called frames which are also referred to as bursts. A midamble corresponds to a training sequence, i.e. a known reference signal, which is transmitted in the middle of such a frame. In analogy, a post-amble is a training sequence transmitted at the end of such a frame or burst. It is necessary for the signals to be buffered since the influences of real signal edges in the received signal can only be corrected if the corresponding training sequence has been received and the signals have been evaluated correspondingly. In an embodiment of the present invention, the signal generator would thus buffer the demodulated received signal, learn the distortions of the transitions in the demodulated received signal after the training sequence has occurred and subsequently output a corrected demodulated received signal in which said influences are reduced.

In another embodiment of the present invention, the reference signal may correspond to known transmitted symbols which may also be recurring during a frame. Then, the signal generator is able to learn the distortions occurring anew on the basis of the recurring known transmitted symbols. In this case, the signal generator might track changing distortions on the basis of the recurring reference signal.

In another embodiment, a known symbol sequence is at first transmitted by a transmitter when transmitting data. This known symbol sequence corresponds to the reference signal so that the signal generator, when receiving the demodulated received signal, knows what time must be between the first two level transitions in the demodulated received signal. Then, it determines the actual time between the first two level transitions in the demodulated received signal and, from this, determines a time shift by means of which it adjust level transitions in the corrected demodulated received signal relative to the demodulated received signal. Thus, the signal generator may, for example, only adjust level transitions occurring in falling signal edges in the received signal or only those level transitions which in the demodulated received signal occur in rising signal edges in the received signal. In principle, however, both variations and combinations, i.e. adjustments to the rising and the falling signal edges, are possible.

A great advantage of the present invention exemplarily results by the fact that, in the case of RFID applications, the transponders can be identified in a safer and faster manner and data can be made available faster. Since, in particular in RFID systems, the radio range is limited, distortions result especially in the border region of the radio range of such systems. The range in RFID systems is increased by embodiments of the present invention. When for example using radio clocks, a receiver can receive and indicate the received signal, in this case consisting of a current time information and a datum information, more quickly. Here, too, the range of the system is increased. In the field of radio beacons, i.e. in the field of localization and determining the position, on the one hand determining the position can be accelerated and be performed in a shorter time by means of the present invention, and additionally a more precise positional determination is possible. The invention presented here can give rise to decisive advantages, in particular in the field of disaster control, such as, for example, when localizing and rescuing injured people.

One embodiment of the present invention shows its advantage when using it in RFID systems in passports to determine travelers' particulars or biometric data in a contactless manner. Since RFID chips can be read out in a faster and interference-proof manner by the present invention, the result is a direct advantage when dealing with travelers, such as, for example, at airports, stations and in trains.

Figure 2:
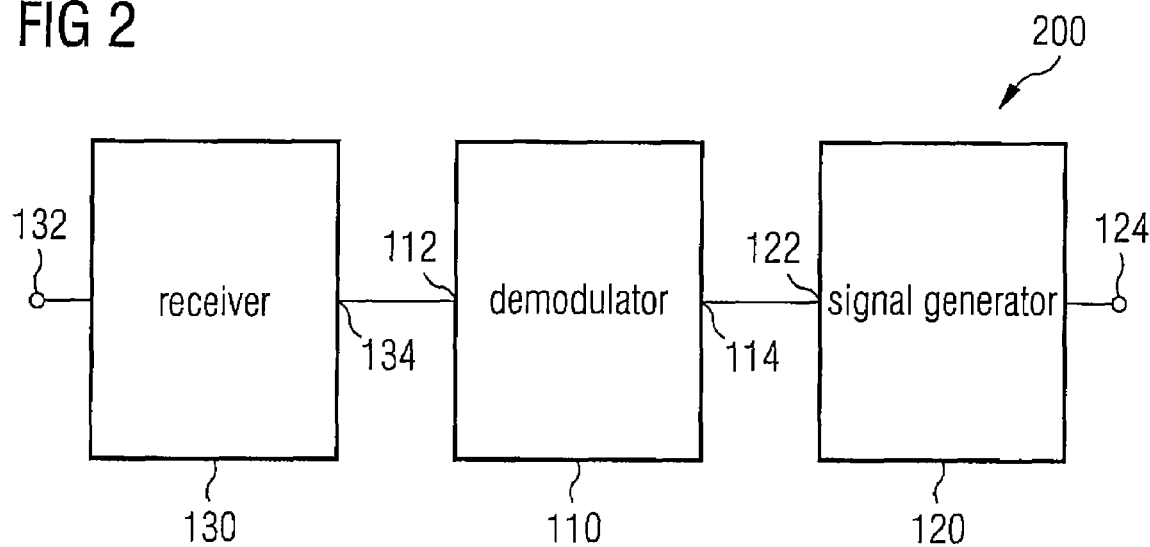
FIG. 2 is a principle block circuit diagram of another embodiment of the present invention.

Another embodiment of the present invention is illustrated in FIG. 2. FIG. 2 shows a signal processing circuit 200 which, apart from the components already shown in FIG. 1, additionally comprises a receiver 130. The receiver comprises an input terminal 132 and an output terminal 134 coupled to the input terminal 112 of the demodulator. The receiver 130 makes the received signal available to the demodulator 110. The received signal here may exemplarily be the envelope of an amplitude-modulated signal. In another embodiment, an ASK signal (ASK=amplitude shift keying) is received and the envelope thereof is passed on to the demodulator 110. In another embodiment, the ASK signal fulfils ISO 14443 standard specifying RFID signal components. In another embodiment, the receiver would receive an OOK signal (OOK=on-off keying) and make the envelope of the signal available to the demodulator 110.

Figure 3:
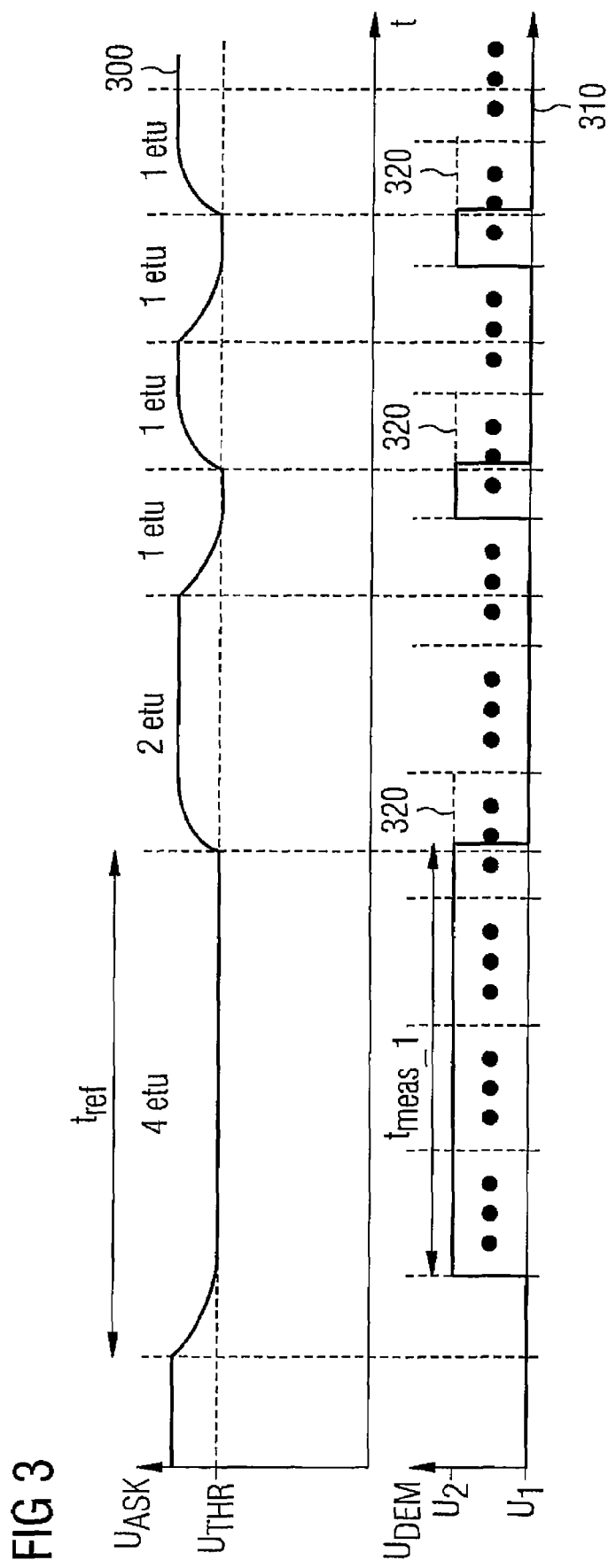
FIG. 3 shows principle signal forms for illustrating an inventive embodiment.

Two signal forms 300 and 310 are illustrated in FIG. 3 to explain a realization of an embodiment. The signal form 300 shows the form of the envelope of an amplitude-modulated signal $U_{ASK}$. In analogy to FIG. 5, a threshold value $U_{THR}$ is indicated, by means of which the demodulator determines level transitions in a demodulated received signal $U_{DEM}$. As has already been described in FIG. 5, the demodulator, for example, will decide for a level $U_1$ if the signal amplitude of the envelope signal $U_{ASK}$ is below the threshold value $U_{THR}$, or for a level $U_2$ if the amplitude of the envelope signal $U_{ASK}$ is above the threshold value $U_{THR}$. The pertaining demodulated received signal $U_{DEM}$ is illustrated in FIG. 3 in the signal form 310.

In analogy to FIG. 5, the time shifts of the level transitions in the demodulated received signal $U_{DEM}$ can also be recognized. According to an embodiment of the present invention, the signal generator 120 then determines the time $t_{meas\_1}$ corresponding to the duration between the first two level transitions in the demodulated received signal $U_{DEM}$. In the present embodiment, it is assumed that a transmitter will at first transmit a start tag. This start tag represents the reference signal so that the signal generator 120 knows that the duration between the first two level transitions in the demodulated received signal $U_{DEM}$ corresponds to a time $t_{ref}$. Based on this known reference time $t_{ref}$ and the certain duration between the level transitions $t_{meas\_1}$, the signal generator can then determine a time by which the second level transition in the example illustrated in FIG. 3 has to be delayed. In FIG. 3, samples are also indicated in the signal form 310 as black points. If the signal generator 120 did not correct the demodulated received signal $U_{DEM}$, a sampler would form two samples of the level value $U_1$ during the last symbol of the start tag and the result would be an error. According to the embodiment of the present invention, the signal generator 120 delays the level transitions from $U_2$ to $U_1$ by the difference between $t_{ref}$ and $t_{meas\_1}$. This is exemplarily indicated in the signal form 310 by dotted corrected signal forms 320.

Figure 4:
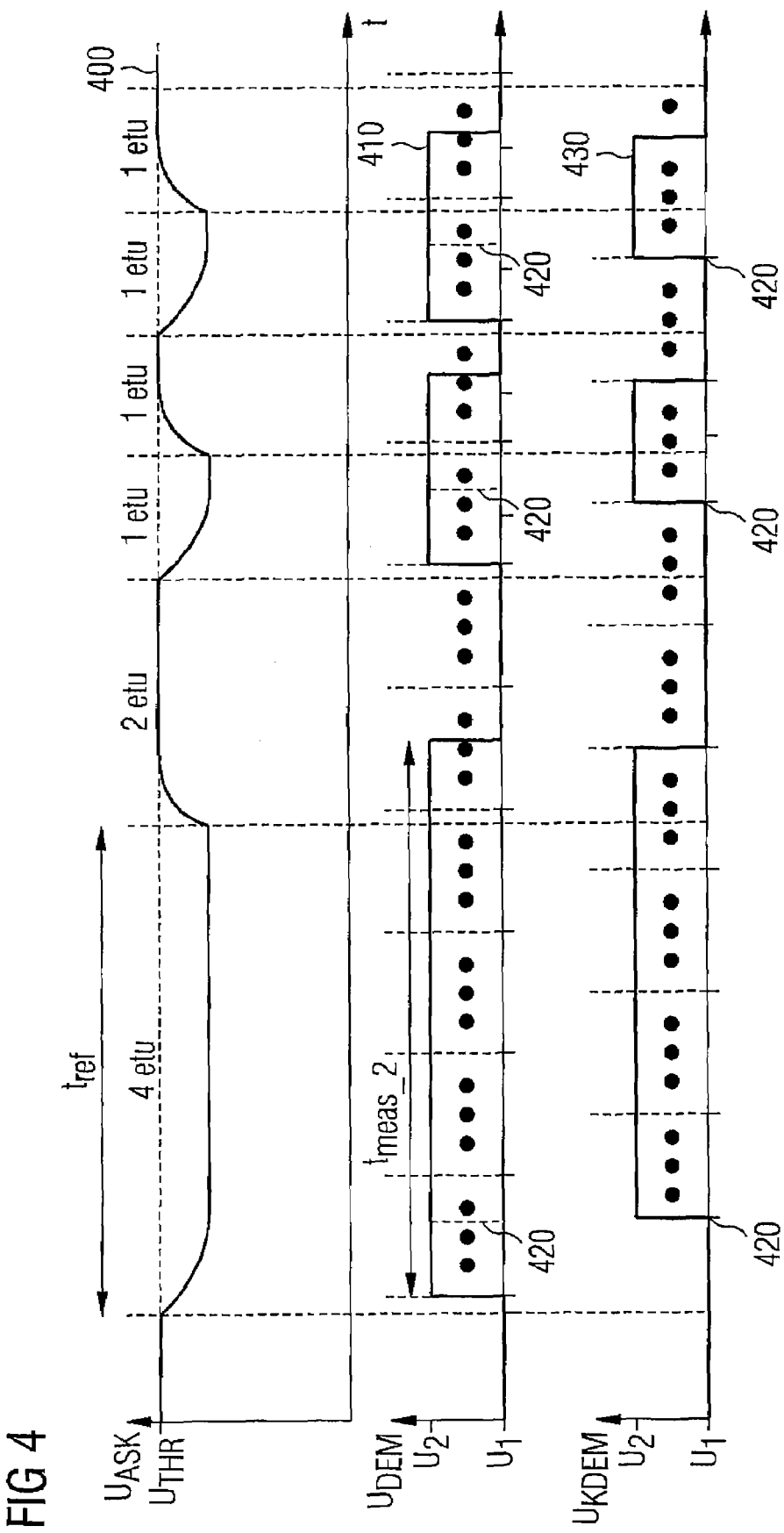
FIG. 4 shows principle signal forms of an inventive embodiment.

Another embodiment will be explained in FIG. 4 referring to the signal forms with another threshold value. FIG. 4 shows three signal forms 400, 410 and 430. The signal form 400 again shows the envelope signal $U_{ASK}$ with a threshold value $U_{THR}$ which, compared to FIG. 3, is set to a higher value. This results, as has already been explained referring to FIG. 6, in the duration between the first two level transitions in the demodulated received signal $U_{DEM}$, which is illustrated in the signal form 410, to be extended.

In analogy to the embodiment of FIG. 3, the signal generator 120 in this embodiment, too, determines the time between the first two level transitions in the demodulated received signal $U_{DEM}$ which in FIG. 4 in the signal form 410 is illustrated as $t_{meas\_2}$. In this example, too, it is assumed that a transmitter will at first transmit a start tag which corresponds to the reference signal and the duration $t_{ref}$ of which is known. The signal generator 120 can then determine the time shift of the level transitions from the difference of the time measured $t_{meas\_2}$ between the two first level transitions in the demodulated received signal $U_{DEM}$ and the reference time $t_{ref}$ and subsequently adjust level transitions in a corrected demodulated received signal correspondingly. In the example considered in FIG. 4, the signal generator could, for example, delay level transitions from the signal level $U_1$ to the signal level value $U_2$ by a corresponding difference between $t_{meas\_2}$ and $t_{ref}$. The signal forms exemplarily corrected in this way are illustrated in FIG. 4 as dotted signal forms 420. The result is that the times between level transitions in the demodulated received signal are compensated and the errors already mentioned in the description of FIG. 6 are avoided. Since a sampler, too, complies with the level transitions in the demodulated received signal $U_{DEM}$, the symbol grid will also shift correspondingly. In FIG. 4, the symbol grid of the distorted signal is indicated by broken lines. Corresponding to the time delay between a level transition $U_1$ to $U_2$ and the corrected signal forms 420, the symbol grid will shift as well. In the signal form 430, the corrected demodulated received signal $U_{KDEM}$ is illustrated with the shifted symbol grid and the samples. It can be recognized that the signal generator 120 corrects the demodulated received signal $U_{DEM}$ and thus avoids decoding errors.

The signal forms in FIGS. 3 to 6 show that different errors can occur in the demodulated received signals. Signal forms where a falling signal edge of the envelope signal $U_{ASK}$ is shifted further than a rising signal edge and signal forms where a rising edge of the envelope signal $U_{ASK}$ is shifted further than a falling signal edge may occur. Due to different signal edges, different time shifts of the level transitions in falling and rising signal edges may occur. Exemplarily, a level transition might also shift by half a symbol duration. Due to the majority decision of a decoder, the result may be a wrong symbol to be decoded. Using the present invention, it is possible to correct the errors occurring and thus to obtain a better and more reliable quality of transmission.

A great advantage is achieved by the present invention with regard to stability of contactless communication, such as, for example, RFID application, in radio clocks or when determining a position. Since transmission stability and robustness are increased by the present invention, the reliability of applications of this kind is increased. In particular, the reliability when determining a position may result in considerable advantages, such as, for example, with regard to applications in disaster control.

What is claimed is:

1. A signal processing circuit, comprising:
   a demodulator having an input for receiving a received signal which includes falling and rising signal edges, and an output for outputting a demodulated received signal which, with signal edges of the received signal, includes transitions from a first level to a second level or vice versa, wherein times of the transitions depend on steepnesses of the signal edges; and
   a signal generator having an input for receiving the demodulated received signal and coupled to the output of the demodulator, and an output for outputting a corrected demodulated received signal which includes transitions, the times of which relative to times of the transitions of the demodulated received signal are set based on a reference signal to reduce influences of the steepnesses of the falling and rising signal edges in the corrected demodulated received signal relative to the demodulated received signal,
   wherein the received signal includes a received reference signal portion which is based on a known reference signal portion, wherein the signal generator is configured to derive from a comparison of a duration of the received demodulated reference signal portion and a duration of the known reference signal portion a time shift by which transitions in the corrected demodulated received signal are set relative to transitions in the demodulated received signal.

2. The signal processing circuit according to claim 1, wherein transitions in the corrected demodulated received signal are shifted relative to transitions in the demodulated received signal based on a comparison of the reference signal to the demodulated received signal.

3. The signal processing circuit according to claim 2, wherein every second transition in the corrected demodulated received signal is shifted relative to the corresponding transition of the demodulated received signal due to the signal edges of the received signal.

4. The signal processing circuit according to claim 2, wherein every transition in the corrected demodulated received signal is shifted relative to the corresponding transition of the demodulated received signal due to the signal edges of the received signal.

5. The signal processing circuit according to claim 1, wherein the received signal includes a start tag which is based on a known signal form corresponding to the reference signal.

6. The signal processing circuit according to claim 1, wherein the reference signal corresponds to a known transmitted symbol or a sequence of known transmitted symbols.

7. The signal processing circuit according to claim 1, wherein the reference signal includes periodically occurring transmitted symbols.

8. The signal processing circuit according to claim 1, further comprising a receiver having an input for receiving an amplitude-modulated signal and an output for outputting an envelope of the amplitude-modulated signal.

9. The signal processing circuit according to claim 8, wherein the receiver comprises an input for receiving an ASK signal.

10. The signal processing circuit according to claim 8, wherein the receiver comprises an input for receiving a signal according to the ISO 14443 standard.

11. The signal processing circuit according to claim 8, wherein the receiver comprises an input for receiving an OOK signal.

12. The signal processing circuit according to claim 1, wherein the demodulator comprises a threshold value decider.

13. A signal processing circuit, comprising:
   a demodulator having an input for receiving a received signal which includes falling and rising signal edges, and an output for outputting a demodulated received signal which includes, with signal edges of the received signal, transitions from a first level to a second level or vice versa, wherein times of the transitions depend on steepnesses of the signal edges; and
   a signal generator having an input for receiving the demodulated received signal and coupled to the output of the demodulator, and an output for outputting a corrected demodulated received signal which includes transitions, the times of which relative to times of the transitions of the demodulated received signal are shifted based on a comparison of a reference signal to the demodulated received signal to reduce influences of the steepnesses of the falling and rising signal edges in the corrected demodulated received signal relative to the demodulated received signal, wherein at least every second transition in the corrected demodulated received signal is shifted,
   wherein the received signal includes a received reference signal portion which is based on a known reference signal portion, wherein the signal generator is configured to derive from a comparison of a duration of the received demodulated reference signal portion and a duration of the known reference signal portion a time shift by which transitions in the corrected demodulated received signal are set relative to transitions in the demodulated received signal.

14. A device for generating a corrected demodulated received signal, comprising:

means for demodulating a received signal which includes falling and rising signal edges, and for generating a demodulated received signal which, with signal edges of the received signal, includes transitions from a first level to a second level or vice versa, wherein times of the transitions depend on the steepnesses of the signal edges; and means for generating the corrected demodulated received signal which includes transitions, the times of which relative to the times of transitions in the demodulated received signal are set based on a reference signal to reduce influences of the steepnesses of the falling and rising signal edges in the corrected demodulated received signal relative to the demodulated received signal, wherein the received signal includes a received reference signal portion which is based on a known reference signal portion, wherein the means for generating is configured to derive from a comparison of a duration of the received demodulated reference signal portion and a duration of the known reference signal portion a time shift by which transitions in the corrected demodulated received signal are set relative to transitions in the demodulated received signal.

15. The device according to claim 14, wherein the means for generating the corrected demodulated received signal shifts, with falling signal edges in the received signal, transitions in the corrected demodulated received signal relative to transitions in the demodulated received signal.

16. The device according to claim 14, wherein the means for generating the corrected demodulated received signal shifts, with rising signal edges in the received signal, the transitions in the corrected demodulated received signal relative to transitions in the demodulated received signal.

17. The device according to claim 14, wherein the means for generating the corrected demodulated received signal determines a time shift based on the reference signal corresponding to a start tag in the received signal.

18. The device according to claim 14, wherein the means for generating the corrected demodulated received signal sets transitions in the corrected demodulated received signal based on a known transmitted signal or a known sequence of transmitted symbols in the demodulated received signal.

19. The device according to claim 14, wherein the means for generating the corrected demodulated received signal sets transitions in the corrected demodulated received signal based on recurring transmitted symbols.

20. The device according to claim 14, further comprising a means for receiving having an input for receiving an amplitude-modulated signal and an output for outputting an envelope of the amplitude-modulated signal.

21. The device according to claim 20, wherein the means for receiving comprises an input for receiving an ASK signal.

22. The device according to claim 20, wherein the means for receiving comprises an input for receiving a signal according to the ISO 14443 standard.

23. The device according to claim 20, wherein the means for receiving comprises an input for receiving an OOK signal.

24. The device according to claim 14, wherein the means for demodulating comprises means for comparing the received signal to a threshold value.

25. A method for generating a corrected demodulated received signal, comprising:

demodulating a received signal which includes falling and rising signal edges to generate a demodulated received signal which includes, with signal edges of the received signal, transitions from a first level to a second level or vice versa, wherein times of the transitions depend on steepnesses of the signal edges of the received signal, wherein the received signal includes a received reference signal portion, which is based on a known reference signal portion;

deriving from a comparison of a duration of the received demodulated reference signal portion and a duration of the known reference signal portion a time shift; and generating the corrected demodulated received signal by setting times of transitions in the corrected demodulated received signal based on the reference signal to reduce influences of the steepnesses of the falling and rising signal edges in the corrected demodulated received signal relative to the demodulated received signal, comprising shifting transitions in the corrected demodulated received signal relative to the transitions of the demodulated received signal by the derived time shift.

26. The method according to claim 25, wherein in the step of shifting, falling signal edges in the received signal are shifted.

27. The method according to claim 25, wherein in the step of shifting, rising signal edges in the received signal are shifted.

28. The method according to claim 25, wherein the reference signal corresponds to a start tag in the received signal.

29. The method according to claim 25, wherein the reference signal comprises a known transmitted symbol or a sequence of known transmitted symbols.

30. The method according to claim 25, further comprising:
receiving an amplitude-modulated signal; and
determining an envelope of the amplitude-modulated signal.

31. The method according to claim 30, wherein the amplitude-modulated signal comprises an ASK signal portion.

32. The method according to claim 30, wherein the amplitude-modulated signal comprises a signal portion of the ISO 14443 standard.

33. The method according to claim 30, wherein the amplitude-modulated signal comprises an OOK signal portion.

34. The method according to claim 30, further comprising comparing the received signal to a threshold value.

* * * * *